March 27, 1928.　　　　　　W. S. HAMM　　　　　　1,663,630
VEHICLE VENTILATOR
Filed Oct. 26, 1925　　　　2 Sheets-Sheet 1

Inventor
William S. Hamm
Attorneys

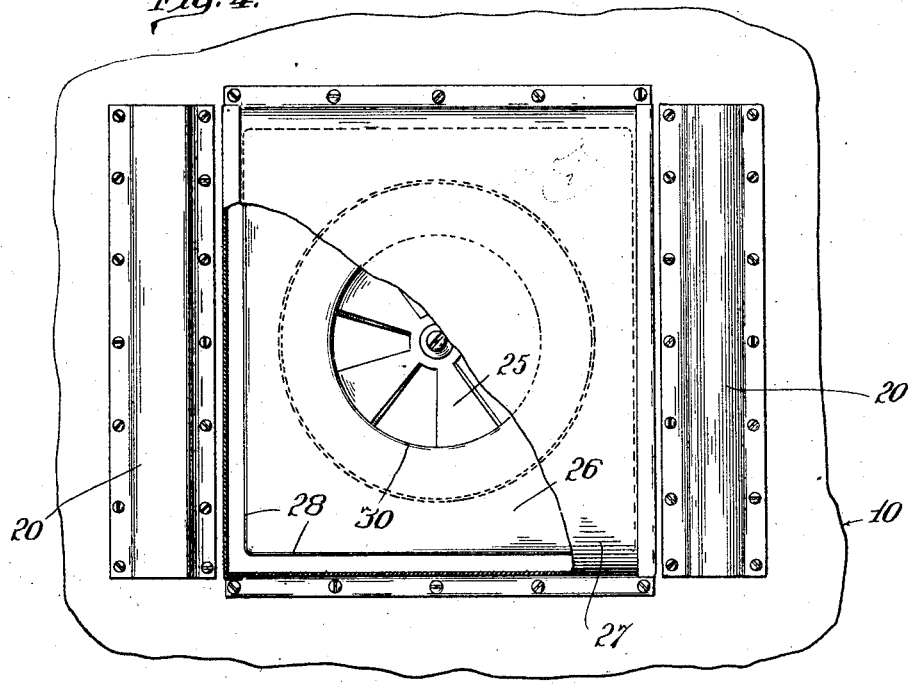
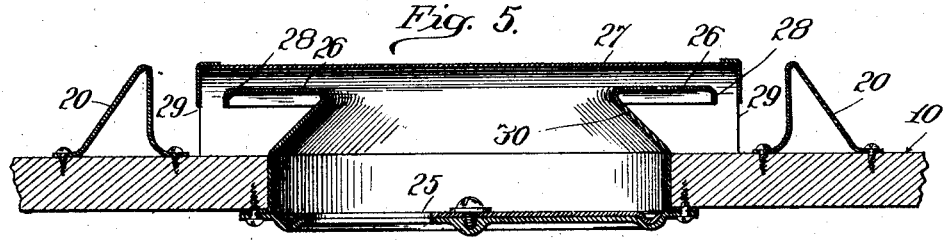
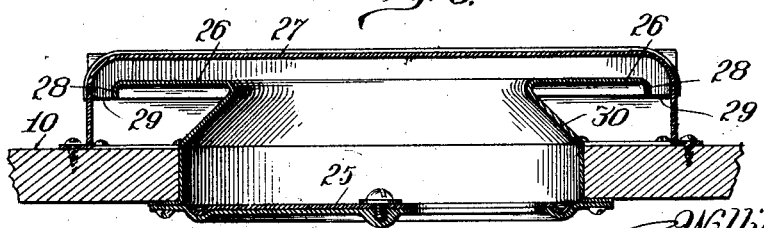

Patented Mar. 27, 1928.

1,663,630

UNITED STATES PATENT OFFICE.

WILLIAM S. HAMM, OF HUBBARD WOODS, ILLINOIS, ASSIGNOR TO THE ADLAKE COMPANY, A CORPORATION OF ILLINOIS.

VEHICLE VENTILATOR.

Application filed October 26, 1925. Serial No. 64,721.

The invention relates to ventilators for vehicles having closed bodies, such as automobiles; its objects being to provide a device for this purpose which shall be compact and consequently unobtrusive in appearance, shall have a high degree of efficiency, and shall effectively exclude the weather from the interior of the vehicle.

A preferred form of construction is hereinafter described, and is illustrated in the accompanying drawings in which Fig. 1 is a plan view of the device, partly broken away;

Fig. 4 is a plan view showing a modification, some parts being broken away; and

Figs. 5 and 6 are central longitudinal and transverse vertical sections of Fig. 4.

Figure 1:
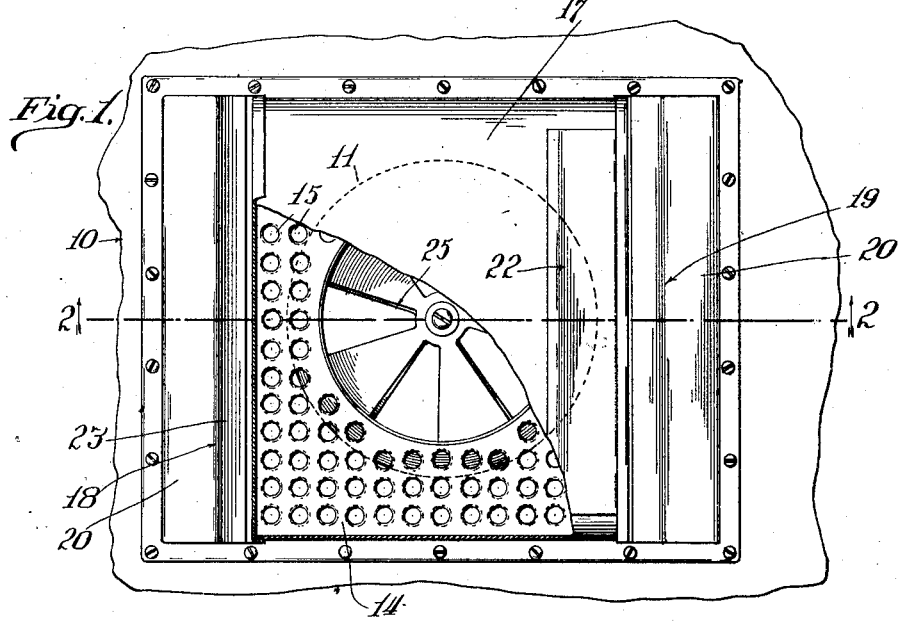

The ventilator is preferably, though not necessarily, applied to the top of a vehicle, and it is thus illustrated. The top wall of an automobile is conventionally shown at 10, and is provided with an aperture 11 through which vitiated air may escape.

The ventilator is applied to the outer surface of the wall 10 over the aperture 11, and comprises a base plate 12, apertured to register with the opening 11. A wall 13, here shown as annular to conform to the shape of the opening referred to, and at least at its lower end of equal diameter therewith, is secured to the base plate and may be of any suitable height. In practice I have found this dimension to be preferably about one-half inch.

An apertured plate 14 is fitted upon and secured to the upper edge of the wall 13, and is, as shown, approximately square, though its shape is immaterial. This plate is freely perforated, as shown at 15, these perforations being preferably though not necessarily surrounded by depending flanges, as 16. A cover plate 17 extends across the device and is spaced apart from the plate 14 to provide a flue chamber in connection therewith. The side margins of the plate 17 are bent or otherwise extended downwardly to contact with the base plate, to which they are secured by any suitable means, preferably by soldering, in order to make a tight joint. The end margins of the plates 14 and 17 are secured together in any suitable manner; as shown this attachment is accomplished by flanging upwardly the ends of the plate 14 to overlap the plate 17. This joint is also preferably soldered to exclude the weather.

Figure 2:
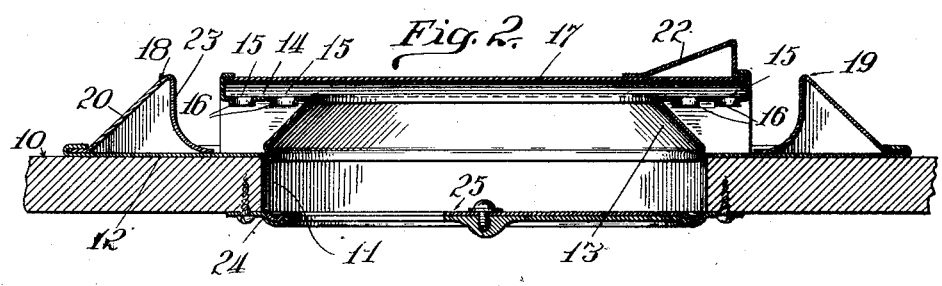
Fig. 2 is a central longitudinal sectional view of the device as applied to the top wall of a vehicle.

By the construction described a flue chamber is provided between the plates 12 and 14, and this chamber is preferably open at each end. Facing each of the open ends of the last-mentioned chamber is a shield 18, 19, which prevents the wind from blowing into the chamber, but, being spaced apart from the ends of the plates 14 and 17, forms with them an open trough across which the wind currents pass and set up a suction action because of their reduced lateral pressure incident to their movement. This suction action induces an outflow of air from the interior of the vehicle through the aperture 11, the ring 13, the flue chamber between the plates 14 and 17, the perforations 15, and outwardly through the flue chamber inclosed between the plates 12 and 14, and through the troughs between the shields 18, 19, and the ends of the body of the device. The front end of the vehicle is to the left, as viewed in Fig. 2. The abutment 19 is placed at the rear end of the device to prevent the entrance of wind approaching in that direction when the vehicle is stationary, or moving at less speed than the velocity of the wind.

Figure 3:
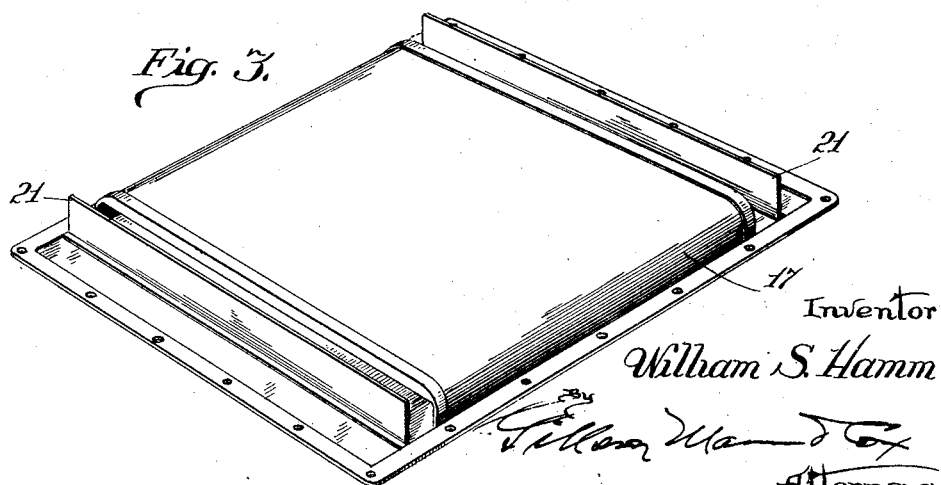
Fig. 3 is a view of the device in perspective, showing a slight modification.

Preferably the shields 18, 19, are provided with outer inclined walls, as shown at 20, for the purpose of deflecting upwardly the air currents in contact with the vehicle top and thus preventing a tendency to form eddies within the trough. However, the device is operative, though perhaps with slightly less efficiency, if this inclined wall is omitted, the shields being formed of a mere upstanding plate 21, as shown in Fig. 3.

In practice it is found that a relatively larger proportion of the exhaust from the interior of the vehicle is at the front end of the device, as heretofore described. The efficiency of the rearward end is increased by placing an upwardly inclined deflector 22 at the rear end of the plate 17, thus tending to prevent eddying within the rearward trough. The inner faces, as 23, of the shields 18, 19, may be curved toward the body of the device near their bases, as shown in Fig.

2, for guiding the outflowing air currents and preventing eddying. An apertured plate 24 is secured to the under side of the wall 10 to inclose the aperture 11, and carries a suitable damper, as 25, which may be closed should it be desired to prevent the operation of the ventilator, or opened to permit the free exit of the vitiated air.

In the construction of Figs. 4, 5 and 6, instead of a foraminous plate for dividing the interior of the casing with upper and lower chambers, an unperforated plate 26 may be used. Such plate is, as shown, of less area than the cover plate 27, thus leaving an open space at its margins. Preferably, though not necessarily, the margins of the plate are flanged downward as shown at 28, for the purpose of checking the tendency of the elements to beat through the openings into the upper chamber.

The end walls of the casing are apertured as represented at 29, the aperture being of such size and shape as may be necessary for the free escape of the vitiated air, and should not extend above the plate 26.

The plate 26 is supported in any suitable manner. As shown, and preferably, it is carried by the tube 30 forming the flue leading from the interior of the compartment to be ventilated.

The base plate 12 is not essential to the operation of the ventilator in any of its forms and is omitted in Figs. 4, 5 and 6, the wall to which the ventilator is applied in effect constituting the bottom of the ventilator.

The device is unobtrusive in appearance, as it need not project above the surface of the vehicle top to exceed one inch, and may be made of less than that height, if desired. The ventilator as described is of high efficiency, and will withdraw the air from a vehicle of the size of an ordinary automobile within a very few minutes, under the influence of a wind of moderate velocity. There can be no accumulation of water within the body of the ventilator, and under most adverse conditions there will be no beating of rain or snow into the flue chamber above the plates 14 or 26, and consequently the weather is entirely excluded from the interior of the vehicle. Any accumulation of snow within the troughs enclosed by the shields which may occur while the vehicle is stationary, is quickly removed by the normal operation of the device when the vehicle is set in motion.

In the normal operation of the device there will be no passage of wind currents through the flue space between the plates 12 and 14. Should, however, the end shields be omitted wind will blow through this chamber and the inductive action will be set up in the perforations in the plate 14.

Various changes in the details of construction may be made within the scope of the invention. The downstanding flange 28 may, if desired, be omitted.

I claim as my invention:

1. In a ventilator, a casing, a perforated plate dividing the interior of the casing into upper and lower chambers, the upper chamber being closed and the lower chamber being open at one end, an air flue leading to the upper chamber from the compartment to be ventilated, and a shield facing and spaced apart from the open end of the lower chamber for preventing wind from blowing into such chamber and for causing it to set up a minus pressure in such chamber.

2. In a ventilator, a casing, a perforated plate dividing the interior of the casing into upper and lower chambers, the upper chamber being closed and the lower chamber being open at each end, an air flue leading to the upper chamber from the compartment to be ventilated, and a shield facing and spaced apart from each end of the lower chamber for preventing wind from blowing into such chamber and for causing it to set up a minus pressure in such chamber.

3. In a ventilator, a casing, a perforated plate dividing the interior of the casing into upper and lower chambers, the upper chamber being closed and the lower chamber being open at each end, an air flue leading to the upper chamber from the compartment to be ventilated, a shield facing and spaced apart from each end of the lower chamber for preventing wind from blowing into such chamber and for causing it to set up a minus pressure in such chamber, and an upwardly inclined deflector mounted on the casing adjacent one end.

4. In a ventilator, a casing, a perforated plate dividing the interior of the casing into upper and lower chambers, the upper chamber being closed and the lower chamber being open at one end, an air flue leading to the upper chamber from the compartment to be ventilated, an upwardly inclined deflector facing and spaced apart from the open end of the lower chamber for preventing wind from blowing into such chamber and for causing it to set up a minus pressure in such chamber.

5. In a ventilator for vehicle bodies, in combination, a casing having openings at both ends and having an opening in its bottom for communicating with the chamber to be ventilated, a perforated plate crossing the upper part of the chamber of the casing above the end openings, a flue leading from the opening in the bottom of the casing through the perforated plate, and means for preventing the entrance of wind currents into the end openings.

6. In a ventilator for vehicle bodies, in combination, a casing open at both ends and having an opening in its bottom for communicating with the chamber to be ventilated, a perforated plate crossing the upper part of the chamber of the casing and having its margins joined to the casing, a flue leading from the opening in the bottom of the casing through the perforated plate, and means for guarding the entrance of wind currents into the casing.

7. In a ventilator for vehicle bodies, in combination, a casing open at both ends and having an opening in its bottom for communicating with the chamber to be ventilated, a perforated plate crossing the upper part of the chamber of the casing and having its margins joined to the casing, a flue leading from the opening in the bottom of the casing through the perforated plate, and shields facing and spaced from the open ends of the casing.

8. In a ventilator for vehicle bodies, in combination, a casing open at one end and having an opening in its bottom for communicating with the chamber to be ventilated, a perforated plate crossing the chamber of the casing above the end opening, a flue leading from the opening in the bottom of the casing through the perforated plate and means for preventing the entrance of wind currents into the end opening.

9. In a ventilator for vehicle bodies, in combination, a casing open at one end and having an opening in its bottom for communicating with the chamber to be ventilated, a perforated plate crossing the upper part of the chamber of the casing and having its margins joined to the casing, a flue leading from the opening in the bottom of the casing through the perforated plate, and means for guarding the entrance of wind currents into the casing.

10. In a ventilator for vehicle bodies, in combination, a casing open at one end and having an opening in its bottom for communicating with the chamber to be ventilated, a perforated plate crossing the upper part of the chamber of the casing and having its margins joined to the casing, a flue leading from the opening in the bottom of the casing through the perforated plate, and a shield facing and spaced from the open end of the casing.

11. In a ventilator, in combination, a casing, an apertured partition dividing the chamber of the casing into upper and lower flue chambers, the upper chamber being externally closed and the lower chamber having external openings, a flue connecting the upper chamber with the compartment to be ventilated and means for preventing the entrance of wind currents into the end opening.

12. In a ventilator, in combination, a casing, an apertured partition dividing the chamber of the casing into upper and lower flue chambers, the upper chamber being externally closed and communicating with the compartment to be ventilated and the lower chamber having external openings, and means for preventing the entrance of wind currents at the external openings.

13. A ventilator for vehicles comprising a laterally open casing and provided with an internal partition forming a flue passage communicating with the body to be ventilated and opening downwardly into the body of the casing and means for preventing the entrance of wind currents at the lateral openings of the casing.

14. A ventilator for vehicles comprising a laterally open casing and provided with an internal partition forming a flue passage communicating with the body to be ventilated and opening downwardly into the body of the casing, the latter opening being flanked by depending flanges and means for preventing the entrance of wind currents at the lateral openings of the casing.

15. In a ventilator, in combination, a casing, an apertured partition dividing the chamber of the casing into upper and lower flue chambers, the upper chamber being externally closed and the lower chamber having external openings, a flue connecting the upper chamber with the compartment to be ventilated, and shields facing the external openings of the casing.

16. A ventilator for vehicles comprising a laterally open casing and provided with an internal partition forming a flue passage communicating with the body to be ventilated and opening downwardly into the body of the casing, and shields facing the lateral openings of the casing.

17. A ventilator for vehicles comprising a casing having a lateral external opening and an opening communicating with the chamber to be ventilated, and a wall interposed between the two openings, a passage being provided adjacent the upper portion of the wall, a perforated plate extending laterally from the wall toward the external opening and below the passage, and means for preventing external air currents from entering the casing.

In testimony whereof I affix my signature.

WILLIAM S. HAMM.